United States Patent [19]
Morisawa et al.

[11] Patent Number: 5,836,783
[45] Date of Patent: Nov. 17, 1998

[54] COMMUNICATION CABLE USED IN A COMPUTER SYSTEM

[75] Inventors: Tahei Morisawa; Nobuhiro Tani; Harumi Aoki, all of Tokyo, Japan

[73] Assignee: Asahi Kogaku Kogyo Kabushiki Kaisha, Tokyo, Japan

[21] Appl. No.: 687,218

[22] Filed: Jul. 25, 1996

Related U.S. Application Data

[62] Division of Ser. No. 325,924, Oct. 18, 1994, Pat. No. 5,573,425.

[30] Foreign Application Priority Data

Oct. 18, 1993 [JP] Japan ............................ 5-61041

[51] Int. Cl.⁶ .................................................. H01R 11/00
[52] U.S. Cl. ............................................................ 439/502
[58] Field of Search ................................... 439/502, 505, 439/506; 307/80, 43, 85, 86, 125, 126, 119

[56] References Cited

U.S. PATENT DOCUMENTS 5,177,665  1/1993  Frank et al. ............................ 439/502

FOREIGN PATENT DOCUMENTS 9407318  3/1994  WIPO .

*Primary Examiner*—Neil Abrams
*Assistant Examiner*—T. C. Patel
*Attorney, Agent, or Firm*—Greenblum & Bernstein, P.L.C.

[57] ABSTRACT

A computer system includes a computer and a peripheral device. A communication cable, used to connect the peripheral device to the computer, has a first cable, a second cable and a patch unit. The first cable encloses a set of power lines and a set of data lines, and the second cable encloses a set of data lines. The patch unit includes a socket with first and second contacts. In the patch unit, the sets of data lines of the first and second cables are connected. One of the power lines is connected to the first contact, and another of the power lines is connected to the second contact. The first cable connects the patch unit with the peripheral device, and the second cable connects the patch unit with the computer. When power is applied from an external source to the first and second contacts, the power is supplied from the first and second contacts to the peripheral device.

2 Claims, 5 Drawing Sheets

# COMMUNICATION CABLE USED IN A COMPUTER SYSTEM

This application is a divisional of application Ser. No. 08/325,924, filed Oct. 18, 1994, now U.S. Pat. No. 5,573,425.

BACKGROUND OF THE INVENTION

The present invention relates to a communication cable which is connected between a peripheral device and a computer.

Conventionally, various peripheral devices such as a bar code reader, for example, can be connected to a computer. Data is exchanged between the computer and the peripheral device through wires within the communication cable.

Generally, the peripheral devices and the computer each have a separate power supply. To reduce the number of power supplies required, a known personal computer system is provided with a DC terminal for supplying DC voltage to a peripheral device. However, due to the limited power supply availability and the restrictions in operating voltage, the range of peripherals which can be connected to this personal computer is limited.

Further, a modification of the communication cable which has a connector provided with a DC terminal for supplying DC voltage to the attached peripheral device, has been proposed. However, there are many peripheral devices which require different voltage levels that can be used with the computer. To supply DC voltage through the connector having different voltage levels, different connectors would be required. This will increase the cost of the computer system to which the peripheral devices are connected.

SUMMARY OF THE INVENTION

It is therefore an object of the invention to provide an improved communication cable used in a computer system for interconnecting a computer and a peripheral device.

For the above object, according to one aspect of the preset invention, a communication cable is provided for connecting a peripheral device to a computer, which includes
    a first cable, enclosing
        a first set of data lines and
        a first set of power lines;
    a second cable enclosing a second set of data lines; and
    a patch unit, which includes a socket containing
        a first contact and
        a second contact.
The patch unit connects the first set of data lines to the second set of data lines.
One of the first set of power lines is connected to the first contact and another of the first set of power lines is connected to the second contact.
The first cable connects the peripheral device to the patch unit and
The second cable connects the patch unit to the computer.
When power is applied from an external source to the first and second contacts, the power is supplied from the first and second contacts to the peripheral device.

According to another aspect of the present invention, a communication cable is provided for connecting a peripheral device to a computer, which includes
    a first cable enclosing
        a first set of data lines and
        a first set of power lines;
    a second cable, enclosing a second set of data lines;
    a third cable enclosing a third set of power lines;
    a patch unit; and
    a socket, which includes
        first contact; and
        a second contact.
The patch unit connects the first set of data lines to the second set of data lines, and the first set of power lines to the third set of power lines.
One of the third set of power lines is connected to the first contact and another of the third set of power lines is connected to the second contact.
Power is applied from an external source via the first and second contacts to the peripheral device.

According to a further aspect of the present invention, a computer system is provided which includes
    a computer;
    a peripheral device; and
    a communication cable which connects the peripheral device to the computer. The communication cable includes
        a first cable, enclosing
            a first set of data lines and
            a first set of power lines;
        a second cable, enclosing a second set of data lines; and
        a patch unit which includes a socket containing
            a first contact and
            a second contact.
The patch unit connects the first set of data lines to the second set of data lines.
One of the first set of power lines is connected to the first contact and another of the first set of power lines is connected to the second contact.
Power is applied from an external source via the first and second contacts to the peripheral device.

According to a still further aspect of the present invention, a computer system is provided which includes
    a computer;
    a peripheral device; and
    a communication cable which connects the peripheral device to the computer. The communication cable includes
        a first cable enclosing
            a first set of data lines and
            a first set of power lines;
        a second cable enclosing
            a second set of data lines
            a second set of power lines and
            a third set of power lines;
        a connector attached to the second cable for connecting the communication cable to the computer; and
        a patch unit, the patch unit which includes a socket containing
            a first contact and
            a second contact.
The patch unit connects the first set of data lines to the second set of data lines.
One of the third set of power lines is connected to the first contact and another of the third set of power lines is connected to the second contact.
When the connector connects the communication cable with the computer, the first set of power lines, the second set of power lines and the third set of power lines are connected.

DESCRIPTION OF THE EMBODIMENTS

A connection cable used in a computer system and embodying the present invention will be described below. In the description, a bar code reader is shown as an example of a peripheral device which is connected to a personal computer.

Figure 1:
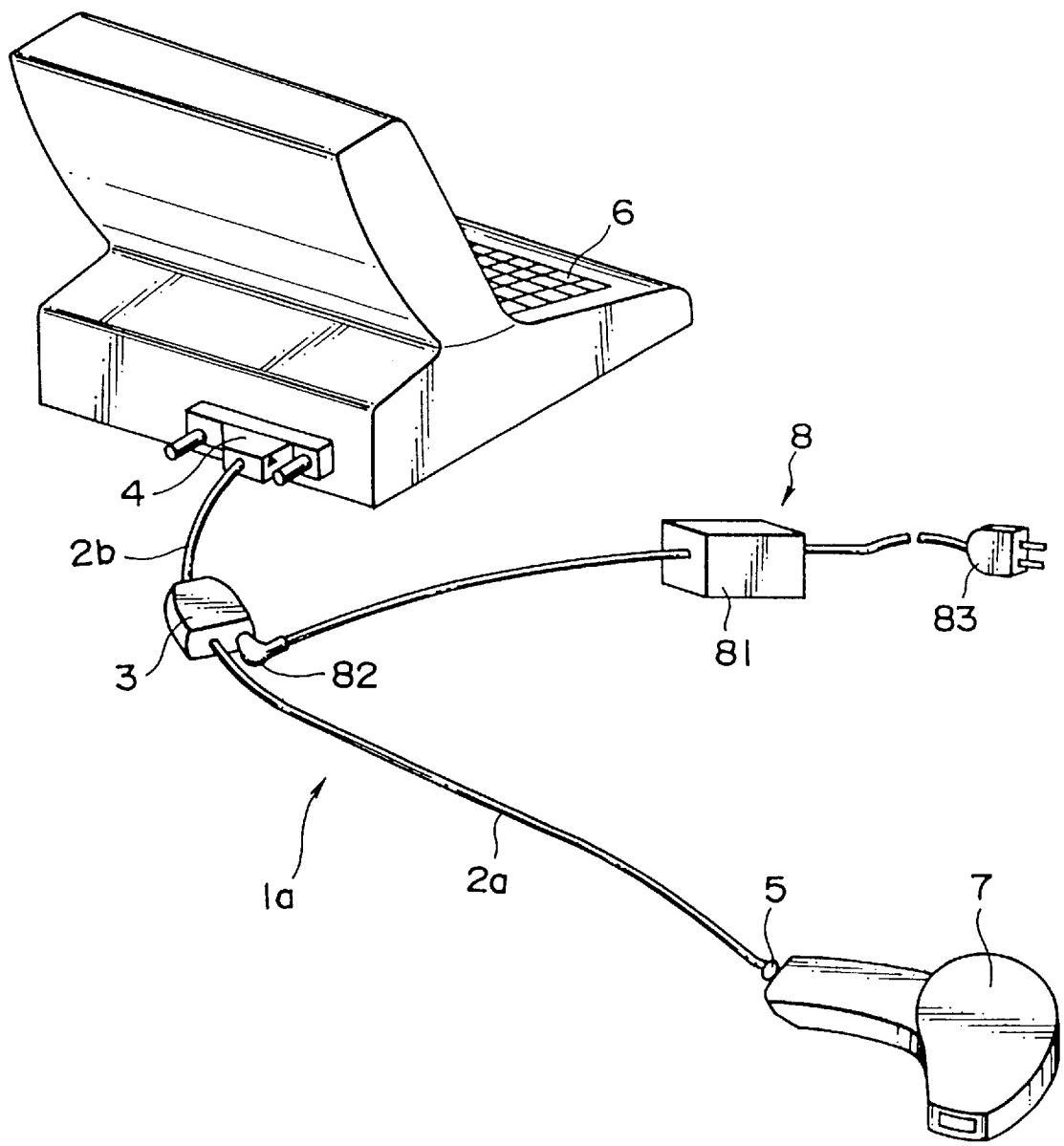
FIG. 1 shows a computer system including a communication cable embodying the present invention connected.

FIG. 1 shows the connection cable 1a which connects a personal computer 6 and a bar code reader 7. The connection cable 1a has a first cable 2a which is connected to a patch unit 3 at one end, and is connected to a connector 5 at the other end. A second cable 2b is connected to a connector 4 at one end, and is connected to the patch unit 3 at the other end. The connector 4 connects the communication cable 1a to the computer 6, while connector 5 connects the communication cable to the bar code reader 7. Data is exchanged between the computer 6 and the bar code reader 7 through communication lines enclosed in the first and the second cables 2a and 2b, and through the patch unit 3. Power supply lines are also included in the first cable 2a, to supply power to the bar code reader 7. An AC adapter 8 having an AC plug 83, an AC/DC converter 81 and a DC plug 82 is attached to the patch unit 3, to provide DC power to the bar code reader 7. The AC adapter 8 is a known device and converts 100–120 VAC to a predetermined DC voltage such as 5 VDC or 12 VDC, and will not be described in detail.

Figure 2:
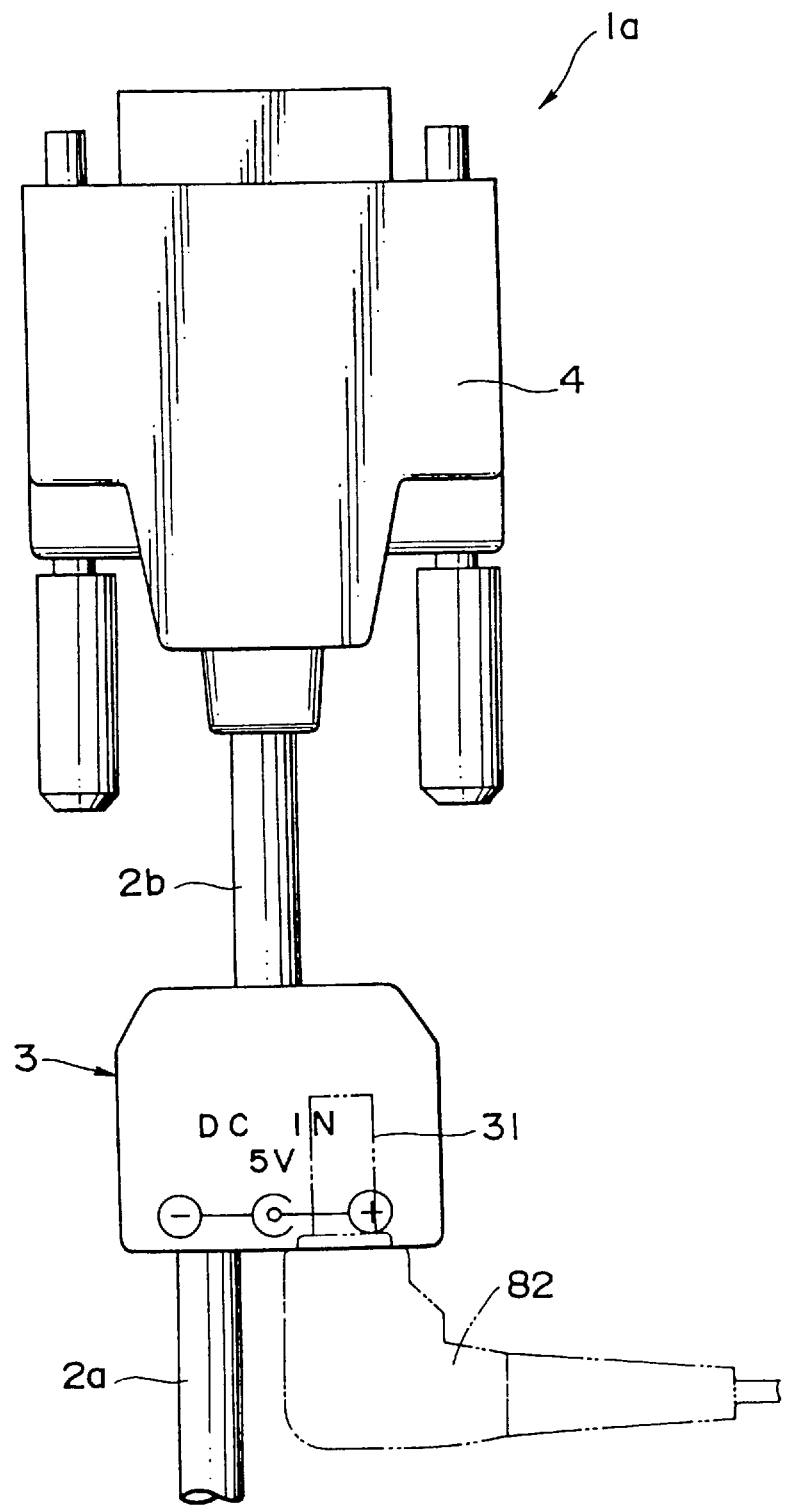
FIG. 2 shows an enlargement of a patch unit of the communication cable shown in FIG. 1.

FIG. 2 shows an enlargement of the patch unit 3. A DC socket 31 is provided in the patch unit and is connected with the DC plug 82. This allows DC power to be supplied to the bar code reader 7 through the cable 2a. in this embodiment, the cable 2a is longer than the cable 2b. The cable 2b is approximately 3 to 7 centimeters in length, so that the patch unit 3 is located near the connector 4, but sufficiently far enough away so as to not interfere with the plugging in of connector 4 into the computer 6.

Figure 3:
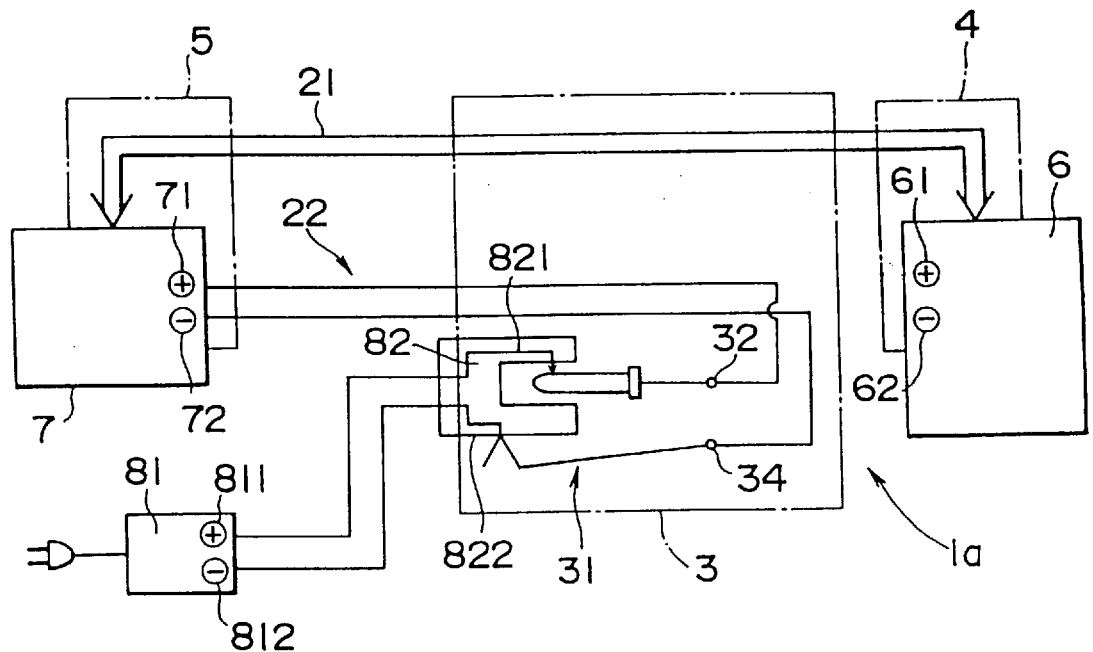
FIG. 3 shows a circuit of the patch unit shown in FIG. 2, according to a first embodiment of the present invention.

FIG. 3 shows a schematic of a circuit of the cable 1a. As shown in FIG. 3, the data lines 21 connect the connectors 4 and 5 through the patch unit 3. The power supply lines 22 are provided between the patch unit 3 and the connector 5, (i.e., the power supply lines are provided in the cable 2a).

When the AC adapter 8 is connected to the patch unit 3, a positive terminal 811 of the AC/DC converter 81, a terminal 821 of the DC plug 82, a terminal 32 of the patch unit 3, and a terminal 71 of the bar code reader 7 are connected. Further, a negative terminal 812 of the AC/DC converter 81, a terminal 822 of the DC plug 82, a terminal 34 of the DC socket, and a terminal 72, are also connected. This establishes a direct DC power supply connection from the AC adapter 8 to the bar code reader 7.

Data communication between the computer 6 and the bar code reader 7 is performed through the data lines 21. The data communicated between the computer 6 and the bar code reader 7 includes control signals from the personal computer 6 to control the bar code reader 7, and data signals transmitted from the bar code reader 7 to the computer 6, for example.

According to the above-described embodiment, regardless of the power, the computer 6 can supply the power required to operate the peripheral device. The peripheral device can be operated since the DC voltage is applied directly to the peripheral device through the patch unit 3. Further, the operating DC voltage of the peripheral device can be different from the voltage levels available from the computer 6, thereby increasing the range of peripheral devices which may be used with the computer 6. If a high voltage peripheral device is to be used with the computer 6, then depending on the voltage level, a different patch unit 3 and first cable 2a may be required. In this case it is easy and inexpensive to manufacture a new communication cable capable of handling this higher voltage since the connector 4 and the second cable 2b remain the same.

Further, since the data lines 21 and the power supply lines 22 are enclosed in the same cable, the connection of a peripheral device to the computer is simplified. This is especially true for hand-held peripheral devices, as they are easier to handle if there is only one cable or wire attached thereto.

Furthermore, different commuters have different styles of connectors, and AC adapters winch output different DC voltage levels also have different styles of DC plugs. Thus by having connector 4 separate from patch unit 3, it is possible to produce many different connector/DC plug configurations for the cable 1a, using a smaller number of parts. This reduces manufacturing time and costs, and allows the patch unit 3 to be quickly replaced if an AC adapter having a different DC plug is to be used.

Further, according to the invention, the patch unit 3 can be provided at any position along the cable 1a, between the connectors 4 and 5.

Figure 4:
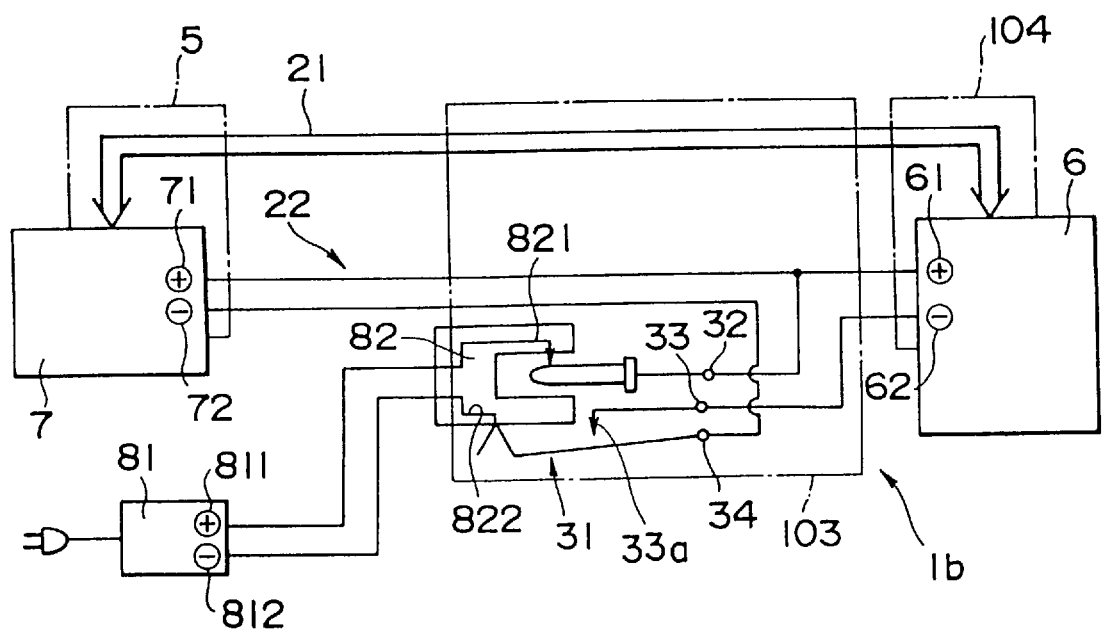
FIG. 4 shows a circuit of the patch unit shown in FIG. 2, according to a second embodiment of the present invention, when an AC adapter is connected.

FIG. 4 shows a second embodiment of the present invention. The cable 1b of the second embodiment allows the power to be supplied to the bar code reader 7 from either the AC adapter unit 8 or the computer 6. The second embodiment is similar to the first embodiment described above, therefore components common to both embodiments have the same reference numerals, and will not be described below.

In this second embodiment, a positive voltage terminal 61 of the computer 6 is directly connected to the positive terminal 71 of the bar code reader 7, and the terminal 32 of the patch unit 3, through the power supply line 22. A negative voltage terminal 62 of the computer 6 is connected to a terminal 33 of the patch unit 3. The negative voltage terminal 72 of the bar code reader 7 is connected to the terminal 34 of the patch unit 3, through the power supply lines 22.

As shown in FIG. 4, the arm 31 which is connected to terminal 34 is biased to contact a contact 33a attached to terminal 33. Therefore, the negative voltage terminal 72 of the bar code reader 7 is connected to the negative voltage terminal 62 of the computer 6.

When the DC plug 82 is inserted into the DC socket of the patch unit 3, terminal 821 of the DC plug 82 contacts terminal 32 of the patch unit 3, and terminal 822 of the DC plug 82 contacts the arm 31 connected to the terminal 34. Further, when the DC plug 82 is inserted, the arm 31 is forced away from the contact 33a connected to terminal 33, thereby breaking the connection between the negative voltage terminal 72 of the bar code reader 7 and the negative voltage terminal 62 of the computer 6. The DC plug 82 is designed such that it moves the arm 31 away from the contact 3a before establishing contact between arm 31 and terminal 822.

Once the DC plug 82 is fully inserted, the negative terminal 72 of the bar code reader is connected to the negative terminal 822 of the DC plug 82. Therefore, the AC adapter 8 supplies power to the bar code reader 7, independent of the power supplied to the computer 6. Thus, if peripheral devices requiring high power levels are used, an auxiliary AC adapter can be used with the patch unit 103 to supply power. Further, the voltage difference between terminal 71 and 72 can be different than the voltage difference between terminals 61 and 62. Thus, the range of peripheral devices that can be used with the computer is not limited to those using the same voltage levels and having low power consumption.

As described above, according to the second embodiment, the terminals 61 and 62 provided on the computer 6 can be used for supplying power to the bar code reader 7. Further, the computer 6 or the AC adapter 8 is selectively used as a power source. Furthermore, even if the DC plug 82 is pulled out of the patch unit 8 during the operation of the bar code reader 7, power is still supplied to the bar code reader 7 from the computer, and the operation is not interrupted.

Figure 5:
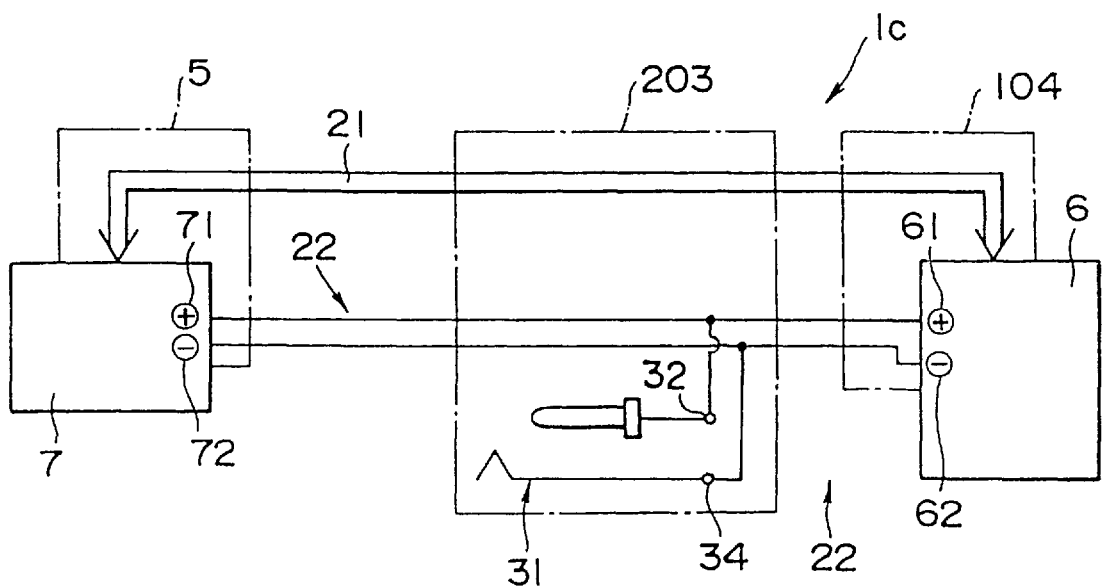
FIG. 5 shows a circuit of the patch unit shown in FIG. 2, according to a third embodiment of the present invention.

FIG. 5 shows a cable 1c having a patch unit 203, according to a third embodiment of the present invention. This is similar to the first embodiment described above, therefore components common to both embodiments have the same reference numerals, and will not be described below.

As shown in FIG. 5, the terminals 61 and 62 of the computer 6 are connected to the terminals 71 and 72, respectively, of the bar code reader 7 (i.e., the DC lines are enclosed in both first cable 2a and second cable 2b). Further, the positive voltage terminals 62 and 72 are connected to the terminals 32 of the patch unit 203, while the negative voltage terminals 61 and 71 are connected to the terminal 34 of the patch unit 203. Further, the data lines 21 and the power supply lines 22 are both enclosed in first cable 2a and second cable 2b.

Figure 6:
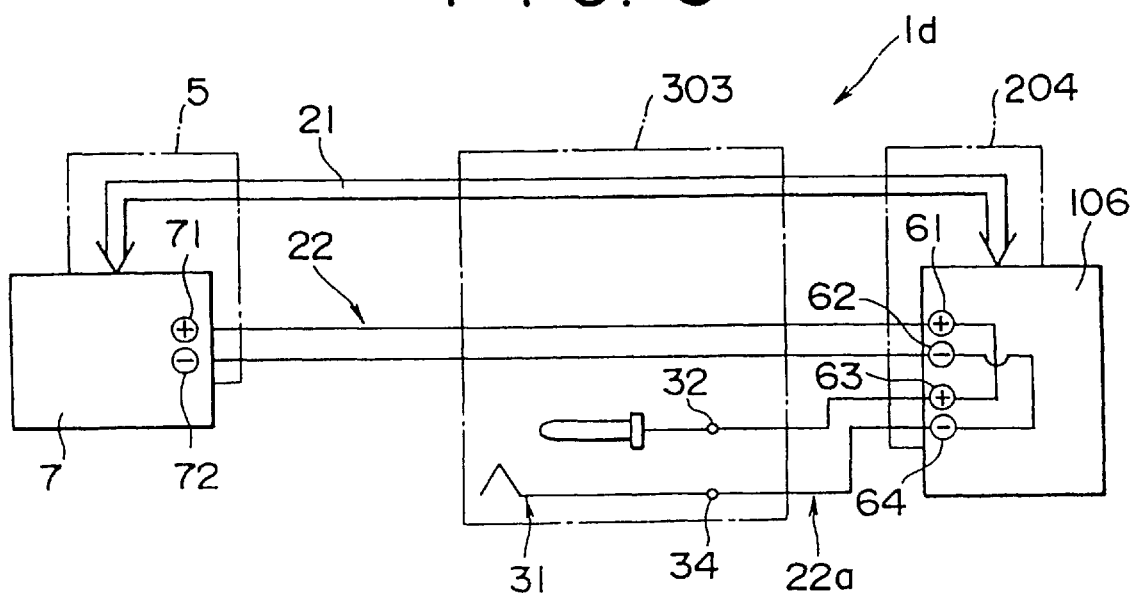
FIG. 6 shows a circuit of the patch unit shown in FIG. 2, according to a fourth embodiment of the present invention.

FIG. 6 shows a cable 1d attached to a computer 106, according to a fourth embodiment of the present invention. This is similar to the third embodiment described above, therefore components common to both embodiments have the same reference numerals, and will not be described below.

In this embodiment, computer 106 is similar to computer 6, except that a second set of DC input terminals 63 and 64 are provided. Terminal 63 is a positive voltage terminal and terminal 64 is a negative voltage terminal.

In this embodiment, the AC adapter supplies DC power to the terminals 32, 34 in the patch unit 303. When the connector 204 is connected with the computer 106, the DC lines 22 and the DC lines 22a are connected through the terminals 61, 62, 63 and 64. Therefore, when the connector 204 is disconnected from the computer 106, no power is supplied to the bar code reader 7.

The present invention is not limited to the embodiments described above. For instance, only one type of DC socket and plug are shown, however any type of DC socket and plug may be used. Further, the data lines 21 may be replaced by an optical fiber cable, in order to transfer data.

Further, various arrangements of the first and second cables 2a and 2b, and the patch unit 3 can be incorporated into the embodiments described above. For instance, the cables 2a and 2b can be arranged collinearly to each other, or at right angles to each other.

Figure 7:
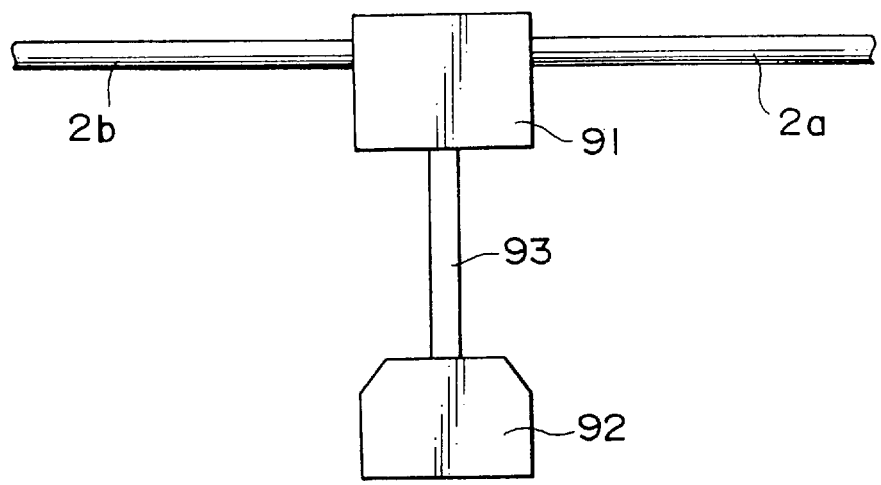
FIG. 7 shows a modification of the patch unit shown in FIG. 2.

FIG. 7 shows a patch unit 91 which is a modification of the patch unit 3 described above. A DC socket 92 is connected by a DC power supply cable 93 to the patch unit 91. In this way, the DC socket can be remote from the patch unit.

A bar code reader has been described as an example of a peripheral device which can be attached to the computer through the communication cable. However, any other peripheral device such as a bar code scanner, a two-dimensional bar code reader, measuring devices, and video cameras, etc. may be connected. Further, the communication cable can be modified to connect more than one peripheral device to the computer.

As described above, a peripheral device having a power consumption which is greater than can be supplied by a computer can be attached to the computer, and supplied with power from an external power AC adapter, using the communication cable. Further, the data lines and power supply lines are housed within a single cable, thereby improving the convenience of using portable peripheral devices.

The present disclosure relates to subject matter contained in Japanese Utility Model Application No. HEI 5-061041 filed on Oct. 18, 1993, which is expressly incorporated herein by reference in its entirety.

What is claimed is:

1. A computer system comprising:

a computer;

a peripheral device; and a communication cable which connects said peripheral device to said computer, said communication cable comprising:
   a first cable, said first cable enclosing:
      a first set of data lines; and
      a first set of power lines;
   a second cable, said second cable enclosing:
      a second set of data lines;
      a second set of power lines; and
      a third set of power lines;
   a connector attached to said second cable for connecting said communication cable to said computer; and
   a patch unit, said patch unit including a socket, said socket comprising:
      a first contact; and
      a second contact,
   wherein said patch unit connects said first set of data lines to said second set of data lines,
   wherein one of said third set of power lines is connected to said first contact and another of said third set of power lines is connected to said second contact, and
   whereby when said connector connects said communication cable with said computer, said first set of power lines, said second set of power lines and said third set of power lines are connected.

2. The communication cable according to claim 1, wherein said second cable has a length such that said patch unit does not interfere with an operation to connect said connector to said computer.

* * * * *